United States Patent [19]

Lim et al.

[11] 3,774,615

[45] Nov. 27, 1973

[54] DEVICE FOR CONNECTING OR JOINING THE ENDS OF INTERRUPTED TUBULAR ORGANS IN SURGICAL OPERATIONS WITHOUT STITCHING

[75] Inventors: Drahoslav Lim; Ladislav Sprincl; Jindrich Kopecek, all of Prague, Czechoslovakia

[73] Assignee: Ceskoslovenska Akadmie Ved, Prague, Czechoslovakia

[22] Filed: Feb. 8, 1971

[21] Appl. No.: 113,195

[52] U.S. Cl. ............................................. 128/334 C
[51] Int. Cl. .............................................. A61b 17/11
[58] Field of Search .................... 128/334 R, 334 C, 128/335, 335.5; 266/343; 260/2.5

[56] References Cited
UNITED STATES PATENTS

| | | | |
|---|---|---|---|
| 2,453,056 | 11/1948 | Zack | 128/334 C |
| 3,220,960 | 11/1965 | Wichterle et al. | 3/1 X |
| 3,520,949 | 7/1970 | Shepherd et al. | 128/334 R X |
| 3,048,177 | 8/1962 | Tararo | 128/334 C |
| 3,254,650 | 6/1966 | Collito | 128/334 C |
| 2,976,576 | 3/1961 | Wichterle et al. | 3/1 X |

*Primary Examiner*—Dalton L. Truluck
*Attorney*—Richard Low and Murray Schaffer

[57] ABSTRACT

This invention covers a device for connecting the ends of interrupted tubular organs without stitching comprising a connecting ring over which the ends of the interrupted organ are pulled, the ring being preferably secured by a fastening means. The ring and fastening means are made from inert material, preferably a hydrophilic gel, which may be swollen to equilibrium or which may be an incompletely swollen hydrogel which is subjected to additional swelling at the place of application. The place of application. The connecting ring may be provided with a groove and may be placed into a ring-shaped fastening means and held therein by fitting the fastening means in the groove or simply held in place by a thread. Two connecting rings may also be used and held together by means of a coupling member made

2 Claims, 7 Drawing Figures

Patented Nov. 27, 1973

DRAhosLav Lím
LADISLAV SPRINCL
JINDŘICH KOPEČEK
INVENTORS

BY *[signature]*
ATTORNEY

Patented Nov. 27, 1973  3,774,615
2 Sheets-Sheet 2
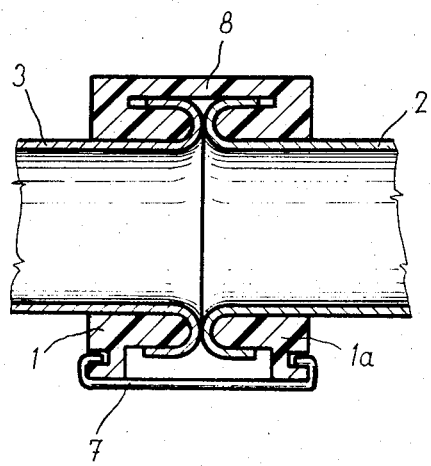
FIG. 5
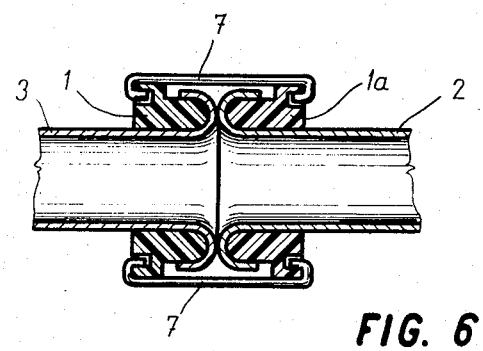
FIG. 6
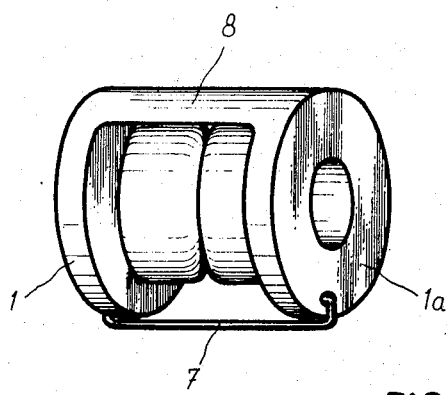
FIG. 7
DRAHOSLAV LÍM
LADISLAV SPRINCL
JINRICH KOPEČEK
INVENTORS
BY 
ATTORNEY

DEVICE FOR CONNECTING OR JOINING THE ENDS OF INTERRUPTED TUBULAR ORGANS IN SURGICAL OPERATIONS WITHOUT STITCHING

BACKGROUND OF THE INVENTION

1. Field Of The Invention

Connection of the ends of interrupted blood vessels, urethras and other tubular organs presents one of the fundamental problems in surgery. Obtaining a most perfect vascular connection is a condition for successful vascular surgery and surgery in general. The serious nature of this problem presents itself dramatically in dealing with mass injuries resulting from catastrophes where surgeons have to carry out many amputations because under the emergency conditions pertaining they cannot connect large vessels to achieve anastomosis.

2. Description Of The Prior Art

End-to-end connection of interrupted vessels is generally possible in two different ways, that is, a. either by connection with stitches, or
b. by stitchless connection.

Connection of interrupted vessels with stitches has inherent drawbacks. For example, it is difficult to perform and requires great skill and experience on the part of the surgeon. Other drawbacks of connection with stitches are the long duration of the operation, the presence of foreign matter, that is stitching material in the lumen of the vessel, a damaged vascular endothelium, and low resistance against infection. These drawbacks are, consequently a source of failures, the rate of occurence of which depends on the experience and skill of the surgeon, the lumen and quality of the vessel, the rate of blood circulation, and the quality of the field of operation.

The above mentioned drawbacks of stitch connecting encouraged experimental and clinical work in an endeavour to perform stitchless vascular connection or anastomosis which would have the advantage of quick execution, perfect adaptation, undamaged vascular endothelium, and the absence of any foreign matter in the vascular lumen. In the development of this technique, same of the developers of stitchless vascular connections used rings prepared from various basic materials of different modifications. However, no permanently satisfactory results could be obtained. Initially these rings were usually made from metal. Later, they were pressed from fibrin in a special manner. However, a metal ring presents a foreign body of relatively heavy weight which does not heal in well and produces pressure necrosis. Fibrin rings are advantageous since they become absorbed after a certain time. Their inherent disadvantage, however, resides in their low strength so that during an operation, and even later on, before healing is complete, they may become damaged with serious results for the patient. In addition, they are relatively expensive and cannot be sterilized by biling; moreover, suitable material is not always available in sufficient quantity for producing a great number of such rings. Consequently, one of the reasons for the failure of the existing methods of making a stitchless vascular connection resides in the fact that no suitable material has been available for making rings which are suitable for stitchless connection in all respects.

Similar problems arise in surgery when connecting or joining other cavity organs, for example oviducts, urethras, pharynxes, intestines, and others. In such cases, there is not only the danger of the stitches cutting through and the wound opening up, which leads to other complications resulting therefrom, but even in the cases where healing is satisfactory, there is also the danger of the stitched cavity organ becoming narrowed, or even impassable.

SUMMARY OF THE INVENTION

It is a general object of the invention to provide a device for stitchless connection or joining of the ends of interrupted tubular organs in surgical operations which is free of the above mentioned drawbacks exhibited by the known state of the art.

Another general object of the invention is to provide an improved device for carrying out stitchless connections of the ends of interrupted tubular and similar organs.

A more specific object of the invention is to provide a device of the above mentioned type comprising a ring over which the ends of the organs are pulled, and preferably also a fastening means, wherein the ring and the fastening means are made from an elastic, physiologically inert material which is preferably a hydrophilic gel which is unswollen or incompletely swollen and which swells additionally at the place of application.

In accordance with a preferred embodiment of the invention, the device comprises a connecting ring located inside a fastening means or device which also has the shape of a ring. The ring and the fastening means are provided on one side with means to insure their connection, preferably a groove or thread. On the other side a hollow or cavity is provided to receive the connected organs.

In accordance with another embodiment of the invention, the device comprises a connecting ring firmly connected on one end by means of an elastic coupling member with another connecting ring, and, on the other side, opposite the elastic coupling member, a removable fastening means or device, The leastic coupling member may also be replaced by a removable fastening means or device.

In still another embodiment of the invention, the elastic coupling member is made from the same material as the two rings, that is preferably from a hydrophilic material and it forms a single unit with the rings.

In general, it is also possible to make the rings from inert elastic material derived from a hydrophobic material, such as, for example, silicon rubber. However, hydrophilic gels, such as, for example, sparingly cross-linked polymers of gycolmethacrylate, have special advantages due to the fact that they can be accurately produced in an unswollen state by mechanical treatment, such as by turning, milling, cutting, filing, grinding, and the like. Moreover, they can be used in an unswollen or slightly swollen state and in which states they possess high strength and tenacity. Furthermore, after being brought into contact with live tissue, they swell additionally into an equilibrium condition, thus providing, on the one hand, a perfect tight connection or anastomosis, and on the other hand, a softness similar to the consistency of the surrounding live tissue. However, even in the fully swollen state, these hydrogels are sufficiently rigid to withstand relatively rough treatment during insertion and/or coupling. Furthermore, their strength can be increased by a suitable filling, such as, for example, a powdered polymer of the same type which is more highly cross-linked and which in no way affects the physiological properties of the hydrogel, but rather increases the modulus of elasticity and reduces elongation with a considerably higher tensile strength. The rings may also be stiffened or strengthened by means of the usual textile inserts which are generally polymerized into them so that they do not project to the surface. Safety rings, replacing the hitherto employed ligatures made from a surgical stitching material, may also be made from the same or similar material.

The great advantage of such materials, in addition to their excellent compatability and chemical stability, is that they can be made in more complicated shapes to provide connections which cannot at all be made from fibrin. Examples of such connections are shown in FIGS. 3 to 7. It is easily possible to cut threads, safety grooves and the like into the unswollen gel and, at least in the partly swollen state, the threads may be tightened during connection or joining of a vessel or other tubular or cavity organ without the danger of causing damage to the tissue by pressure which would be inevitable if similar constructions made of metal were used, apart from the prohibitive large mass of such metal connections, Such threads or grooves cannot be pressed into fibrin because of the relative hardness of the ring in the unswollen state and because of the insufficient strength of such rings in the swollen state.

All types of rings in accordance with the invention permit quick and reliable connection of interrupted vessels and other tubular organs by pressing corresponding sides against each other. An optimum degree of the pressure may be chosen in order to secure quick healing without causing pressure necroses. The lumen of the vessel and the like does not change and no pockets are produced which might lead to the creation of thromboses of infectious beds due to local stagnation of the flow of blood or other body fluid. The elasticity of the material is sufficient to secure the connection against losening, yet not so large as to cause damage to the tissue by pressure.

A device in accordance with the invention may be conveniently used for stitchless end-to-end connection of interrupted lymphatic and blood vessels, that is veins and arteries, and also when employing classical and modern vessel substitutes, such as vein autotransplants, fresh ad preserved homotransplants and vessel substitutes of plastic materials, such as dacron, teflon, and other. The device of the invention may also be used for stitchless end-to-end connection of interrupted cavity organs such as urethras, oviducts, pharynxes, guts and others, and when using classical or modern types of substitutes of cavity organs, such as, for example, aritifical urethras and oviducts.

The rings may be used in a great variety of sizes for connecting vessels from the thinnest size up to the size of an aorta. The employed material permits the production of rings that are sufficiently strong and elastic but which, however, do not produce pressure necroses like metal rings. Their strength is greater than the strength of fibrin rings, and their production is substantially simpler. Moreover, the various structural modifications allow the surgeon to choose the most suitable coupling devices for each actual case. Easy manipulation of these rings permits even a less skilled surgeon to provide high quality surgical aid under conditions where it would otherwise not be available.

Extremely good biological compatibility of the employed material has been proved by experiments carried out over an extended period of time on animals, and by prolonged application in clinical practice. The material is very easily sterilized by boiling for about 20 minutes and it can be easily preserved in storage.

The invention is further illustrated in the following description which is to be read in conjunction with the accompanying drawings illustrating preferred embodiments thereof.

THE DRAWINGS

FIG. 5 illustrates in section another embodiment of the device of this invention using two separate rings connected by means of a stationary elastic coupling member and a removable, and by means of another removable coupling member;

FIG. 6 is a sectional view of a device with two rings connected by means of two removable fastening means or devices; and FIG. 7 is a full view of a device such as that as illustrated in FIG. 5 in which the elastic coupling member is made from the same material as the rings and forms a single unit.

Figure 1:
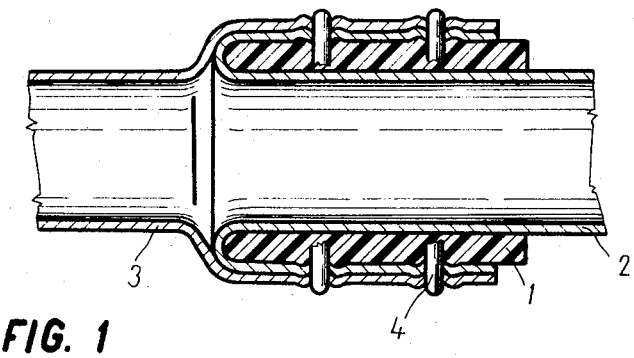
FIG. 1 is a sectional view of a device in accordance with the invention employing two fastening means or devices.

Referring now more particularly to FIG. 1, there is shown a connecting ring 1 made from a hydrophilic gel with two grooves (not shown) on the surface for receiving the fastening means or devices to attach the vessel 2. The connecting ring 1 is pulled over one end of the vessel 2 which is then pulled over the connecting ring 1 and can be secured by means of a safety ligature. The other end of the vessel 3 is then pulled over and is secured by means of two fastening means or devices 4 in the grooves. The fastening means or devices 4 may be ligatures made from a stitching material, or split elastic fastening devices made from a metal, having enlarged end portion to facilitate manipulation or non-split fastening means or devices made from a plastic material, such as, for example a hydrophilic gel or other similar material. These fastening means or devices are pulled over the second end of the vessel 3 before putting vessel 3 on the connecting ring 1.

Figure 2:
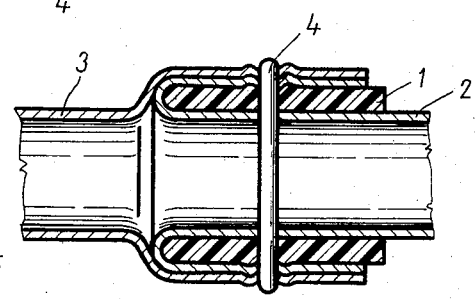
FIG. 2 is a sectional view of an embodiment of a device in accordance with the invention employing only one fastening means or device.

The fastening means or devices 4 for stitchless connection illustrated in FIGS. 1 and 2 may also be made of metal, such as for example a vitallium wire, the ends being arranged so that they may be fitted into each other or fixed by a stitch. However, it is more advantageous to make an elastic endless ring from hydrogeous which may be braced by a formed polyester or similar yarn which is able to follow the elongation and shrinkage of the fastening means or device 4. Another possibility is to use a fastening means or device made from silicon rubber or from a similar inert material.

The connecting ring 1 illustrated in FIG. 2 differs from the preceding one only in that it is shorter and that it has only one groove for the fastening means or device 4 and that it is secured only by one fastening means or device 4. It is satisfactory in the majority of cases where the connection is not strained to a great extent. Such a ring can be put on faster and simpler.

Figure 3:
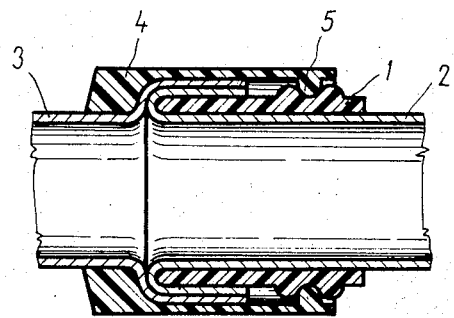
FIG. 3 is a sectional view of a device in accordance with the invention using an internal connecting ring and an external fastening means or device having the shape of a ring, the ring and fastening means or device being connected by means of a groove.

In the connection illustrated in FIG. 3, the internal connecting ring 1 is put on one end of the vessel 2 and the external fastening means or device 4 having the shape of a ring is put on the other end of the vessel 3. After pulling the edge of the vessel 2 over the connecting ring 1, the other end of the vessel 3 is pulled over the assemblage and it is secured firmly by placing the fastening means or device 4 having the shape of a ring into the groove 5.

Figure 4:
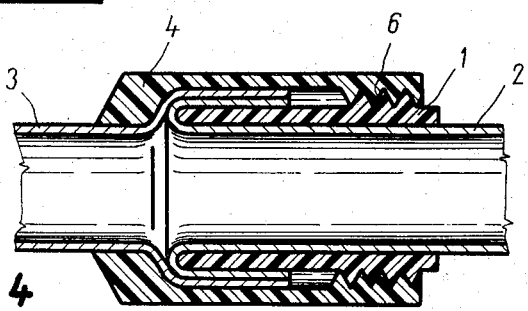
FIG. 4 shows a sectional view of a similar embodiment of the device in accordance with the invention in which the ring and fastening device are connected by means of threads.

The device illustrated in FIG. 4 is of the same construction as the device illusrated in FIG. 3, the only difference being the fact that the groove 5 for the fastening means or device 4 is replaced by a thread 6 provided both in the connecting ring 1 and in the fastening means or device 4. This thread 6 permits accurate and fine connection of the ends of the vessels 2 and 3 in connections which are subject to heavy strains.

The device shown in FIG. 5 has two similar rings 1, 1a with a collar-shaped widening on the edge. The two rings are connected by means of an elastic coupling member 8 of the same or a similar material on one side. They also have holes for the fastening means or device 7 on the opposite side. Each end of the vessel is pulled through one of the rings 1, 1a, and their connection is achieved by putting on the fastening means or device 7. The connection is less firm than the connection achieved by the preceding methods. The elastic bridge, that is the coupling member 8, may be replaced by a pull-over fastening device, for example as illustrated in FIG. 6.

If the elastic coupling member 8 is made from the same material as the two rings 1 and 1a, it may form with the rings 1 and 1a a single unit, as shown in FIG. 7. In this case the coupling member 8 occupies conveniently about one tenth part of the circumference of the ring.

It is to be understood that the invention is not limited to the embodiments illustrated in the accompanying drawings and many modifications may be made without departing from the spirit and scope thereof.

Tests and experiments have been carried out with gels made from polymers of ethylene glycolmonomethacrylate which were cross-linked with less than 10 percent of a cross-linking agent, such as, for example, ethylene glycoldimethacrylate, or their copolymers, such as, for example, diethylene glycolmethacrylate with methylmethacrylate, acrylonitrile, methacrylic acid, and the like. However it is also possible to use other physiologically inert hydrogels, for example polymeric N-alkyl methacrylamides, N-alkyl acrylamides, N,N-dialkyl acrylamides, and the like. These hydrogels may also contain suitable drugs which facilitate healing, such as, for example, antibiotics, collagen, globulin, and the like which may be introduced into the polymer before and during polymerisation or even added after polymerization when the gel is in the swollen state.

What is claimed is:

1. A device for stitchless connection or joining of the ends of interrupted tubular organs in surgical operations comprising a one piece connecting unit consisting of two connecting rings united by an elastic coupling member formed from a plastic physiologically inert material, said rings having a continuous circumference, said coupling member extending partially about the circumference of said rings and clip means removably secured to said connecting unit opposite said coupling member bridging the distance between said connecting rings to hold the ends of said organs in abutment.

2. A device according to claim 1 wherein said inert material comprises at least a partially unswollen hydrogel capable of swelling in place of application on contact with said body fluids.

* * * * *